US012768301B2

(12) United States Patent
Pellerin et al.

(10) Patent No.: US 12,768,301 B2
(45) Date of Patent: Oct. 20, 2026

(54) OIL DISTRIBUTION SYSTEM FOR AIRCRAFT ENGINE WITH MAKE-UP FLOW

(71) Applicant: PRATT & WHITNEY CANADA CORP., Longueuil (CA)

(72) Inventors: Hugues Pellerin, Montréal (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/954,843

(22) Filed: Nov. 21, 2024

(65) Prior Publication Data

US 2026/0139625 A1 May 21, 2026

(51) Int. Cl.

*F01D 25/20* (2006.01)
*F02C 7/06* (2006.01)
*F16H 57/04* (2010.01)

(52) U.S. Cl.

CPC ............ *F02C 7/06* (2013.01); *F05D 2260/98* (2013.01); *F16H 57/0402* (2013.01); *F16H 57/0435* (2013.01); *F16H 57/0436* (2013.01); *F16H 57/045* (2013.01)

(58) Field of Classification Search

CPC . F16N 39/002; F16N 7/38; F02C 7/06; F16H 57/0435; F05D 2260/98
See application file for complete search history.

(56) References Cited

U.S. PATENT DOCUMENTS 4,511,016 A * 4/1985 Doell ...................... F01D 25/20 184/6.28
4,891,934 A 1/1990 Huelster
5,004,407 A * 4/1991 Hutchison ............. F04C 11/001 418/199

(Continued)

FOREIGN PATENT DOCUMENTS

BE 1026196 11/2019
CA 3040146 A1 * 10/2019 ............... F01M 1/18

(Continued)

OTHER PUBLICATIONS

European Patent Office, Communication re: extended European search report mailed Mar. 25, 2026 re: European Patent Application No. 25217822.3.

*Primary Examiner* — Michael A Riegelman
(74) *Attorney, Agent, or Firm* — NORTON ROSE FULBRIGHT CANADA LLP

(57) ABSTRACT

An oil supply system, has: an oil tank; a closed-loop oil circuit including a component, a pump having a pump inlet and a pump outlet, and a de-aerator; a make-up flow conduit connecting the oil tank to the closed-loop oil circuit; a make-up pump connected to the closed-loop oil circuit; a recirculation conduit in parallel to the make-up pump and bypassing the make-up pump; a fixed orifice fluidly connected to the make-up flow conduit upstream of the closed-loop oil circuit and downstream of the recirculation conduit, the fixed orifice having an area selected to increase a pressure at an outlet of the make-up pump above a pressure (Continued)

at the de-aerator inlet; and a metering orifice connected on the recirculation conduit and having a flow circulating area selected to reduce a flow rate inputted into the closed-loop oil circuit below a flow rate generated by the make-up pump.

20 Claims, 7 Drawing Sheets

(56) References Cited

U.S. PATENT DOCUMENTS

| | | | | |
|---|---|---|---|---|
| 5,584,650 | A * | 12/1996 | Redmond | F16N 39/002 415/55.5 |
| 8,201,664 | B2 * | 6/2012 | Brouillet | F01D 25/20 184/6.24 |
| 8,601,785 | B2 * | 12/2013 | Legare | F01D 25/20 60/39.08 |
| 9,849,411 | B2 * | 12/2017 | Sheridan | F16N 39/06 |
| 10,393,313 | B2 * | 8/2019 | Beier | F16N 7/40 |
| 11,236,637 | B2 * | 2/2022 | Parnin | F01M 11/067 |
| 11,542,845 | B2 * | 1/2023 | Tomescu | F01M 1/02 |
| 11,655,731 | B2 * | 5/2023 | Legare | F16H 57/0452 60/39.08 |
| 11,719,128 | B2 * | 8/2023 | Gauthier | F02C 7/06 184/6.11 |
| 11,921,525 | B1 * | 3/2024 | Alecu | G01F 15/005 |
| 12,129,921 | B2 * | 10/2024 | Fiesel | B60K 25/06 |
| 12,234,767 | B2 | 2/2025 | Pellerin | |
| 12,480,424 | B1 * | 11/2025 | Naccache | F02C 7/06 |
| 12,523,176 | B2 * | 1/2026 | Ertas | F02C 7/36 |
| 2003/0136371 | A1 * | 7/2003 | Killion | F04F 5/54 123/198 C |
| 2009/0101444 | A1 * | 4/2009 | Alecu | F16N 39/04 184/11.2 |
| 2010/0065374 | A1 * | 3/2010 | Szolomayer | F01M 11/067 700/282 |
| 2019/0226358 | A1 * | 7/2019 | Beier | F01D 25/20 |
| 2021/0254506 | A1 | 8/2021 | Legare et al. | |
| 2023/0010133 | A1 * | 1/2023 | Gauthier | F01M 5/025 |
| 2024/0328352 | A1 * | 10/2024 | Pellerin | F02C 7/06 |
| 2025/0043721 | A1 * | 2/2025 | Pellerin | F16N 25/02 |
| 2025/0361821 | A1 * | 11/2025 | Gravina | F01D 25/20 |

FOREIGN PATENT DOCUMENTS

| | | | |
|---|---|---|---|
| CN | 117072653 | | 11/2023 |
| EP | 3670863 | A1 | 6/2020 |
| EP | 4438863 | A1 | 10/2024 |

* cited by examiner

OIL DISTRIBUTION SYSTEM FOR AIRCRAFT ENGINE WITH MAKE-UP FLOW

TECHNICAL FIELD

The disclosure relates generally to aircraft engines and, more particularly, to lubrication system used in such engines.

BACKGROUND

Certain components of aircraft engines, and in particular gas turbine engines, employ oil for lubricating and/or cooling such components. In some cases, the oil that has been used for lubrication and/or cooling collects air, which is then removed from the oil. While existing oil systems are suitable for their intended purposes, improvement of such systems is sought.

SUMMARY

In one aspect, there is provided an oil supply system of an aircraft engine, comprising: an oil tank; a closed-loop oil circuit including a component having an inlet and a scavenge outlet, a pump having a pump inlet and a pump outlet, the pump outlet hydraulically connected to the inlet of the component, and a de-aerator having a de-aerator inlet hydraulically connected to the scavenge outlet, a de-aerator air-oil outlet in fluid flow communication with the oil tank, and a de-aerator oil outlet hydraulically connected to the main pump inlet; a make-up flow conduit fluidly connecting the oil tank to the closed-loop oil circuit; a make-up pump having a make-up pump inlet fluidly connected to the oil tank and a make-up pump outlet fluidly connected to the closed-loop oil circuit; a recirculation conduit in parallel to the make-up pump, the recirculation conduit fluidly connecting the make-up pump outlet to the make-up pump inlet while bypassing the make-up pump; a fixed orifice fluidly connected to the make-up flow conduit upstream of the closed-loop oil circuit and downstream of the recirculation conduit, the fixed orifice having an area selected to increase a pressure at an outlet of the make-up pump above a pressure at the de-aerator inlet; and a metering orifice fluidly connected on the recirculation conduit, the metering orifice having a flow circulating area selected to reduce a flow rate inputted into the closed-loop oil circuit below a flow rate generated by the make-up pump.

The oil supply system as defined above and described herein includes, in certain embodiments, any one or more of the following features, in whole or in part, and in any combination.

In some embodiments, the metering orifice is defined by a valve having a plurality of configurations each associated to a respective area of the metering orifice.

In some embodiments, the valve is a pressure-referenced valve having a first reference port fluidly connected to the air-oil outlet of the de-aerator and a second reference port fluidly connected to the closed-loop oil circuit between the component and the de-aerator, the pressure-referenced valve configured to vary the area of the metering orifice as a function of a pressure difference between a first pressure at the first reference port and a second pressure at the second reference port.

In some embodiments, an area of the metering orifice is fixed.

In some embodiments, a check valve is fluidly connected on the recirculation conduit, the check valve preventing oil from flowing from the oil tank to the closed-loop oil circuit via the recirculation conduit.

In some embodiments, a second recirculation conduit extends in parallel to both of the make-up flow pump and the recirculation conduit, the second recirculation conduit fluidly connecting the make-up pump outlet to the make-up pump inlet while bypassing both of the make-up pump and the recirculation conduit.

In some embodiments, a check valve is fluidly connected on the second recirculation conduit, the check valve preventing oil from flowing from the oil tank to the closed-loop oil circuit via the second recirculation conduit, the check valve configured to permit a flow of the oil through the second recirculation conduit when a pressure at the fixed orifice is above a pressure threshold.

In some embodiments, a scavenge pump is hydraulically connected to the closed-loop oil circuit downstream of the component and upstream of the de-aerator inlet.

In some embodiments, the make-up flow conduit is fluidly connected to the closed-loop oil circuit downstream of the scavenge pump and upstream of the de-aerator relative to an oil flow in the closed-loop oil circuit.

In some embodiments, the component is one or more of an accessory gearbox and a bearing cavity.

In another aspect, there is provided an aircraft engine, comprising an oil supply system having: a component receiving oil from a pump and outputting an air-oil mixture to a de-aerator; a make-up flow conduit for inputting a make-up flow of the oil from an oil source to the component; a make-up pump having a make-up pump inlet fluidly connected to the oil source and a make-up pump outlet in fluid flow communication with the component; a recirculation conduit extending in parallel to the make-up pump, the recirculation conduit fluidly connecting the make-up pump outlet to the make-up pump inlet while bypassing the make-up pump; a fixed orifice for increasing a pressure at an outlet of the make-up pump above a pressure at a inlet of the de-aerator; and a metering orifice fluidly connected on the recirculation conduit and configured to reduce a flow rate inputted into the component below a flow rate generated by the make-up pump.

The aircraft engine as defined above and described herein includes, in certain embodiments, any one or more of the following features, in whole or in part, and in any combination.

In some embodiments, the metering orifice is defined by a valve having a plurality of configurations each associated to a respective area of the metering orifice.

In some embodiments, the valve is a pressure-referenced valve having a first reference port fluidly connected to an air-oil outlet of the de-aerator and a second reference port fluidly connected between the component and the de-aerator, the pressure-referenced valve configured to vary the area of the metering orifice as a function of a pressure difference between a first pressure at the first reference port and a second pressure at the second reference port.

In some embodiments, an area of the metering orifice is fixed.

In some embodiments, a check valve is fluidly connected on the recirculation conduit, the check valve preventing oil from flowing from the oil source towards the component via the recirculation conduit.

In some embodiments, a second recirculation conduit extends in parallel to both of the make-up flow pump and the recirculation conduit, the second recirculation conduit fluidly connecting the make-up pump outlet to the make-up pump inlet while bypassing both of the make-up pump and the recirculation conduit.

In some embodiments, a check valve is fluidly connected on the second recirculation conduit, the check valve preventing oil from flowing from the oil source towards the component via the second recirculation conduit, the check valve configured to permit a flow of the oil through the second recirculation conduit when a pressure at the fixed orifice is above a pressure threshold.

In some embodiments, a scavenge pump is hydraulically connected to a scavenge outlet of the component and upstream of the de-aerator.

In some embodiments, the make-up flow conduit is fluidly connected to an oil conduit fluidly connecting the scavenge pump to the de-aerator.

In some embodiments, the component is one or more of an accessory gearbox and a bearing cavity.

BRIEF DESCRIPTION OF THE DRAWINGS

Reference is now made to the accompanying figures in which.

DETAILED DESCRIPTION

Figure 1:
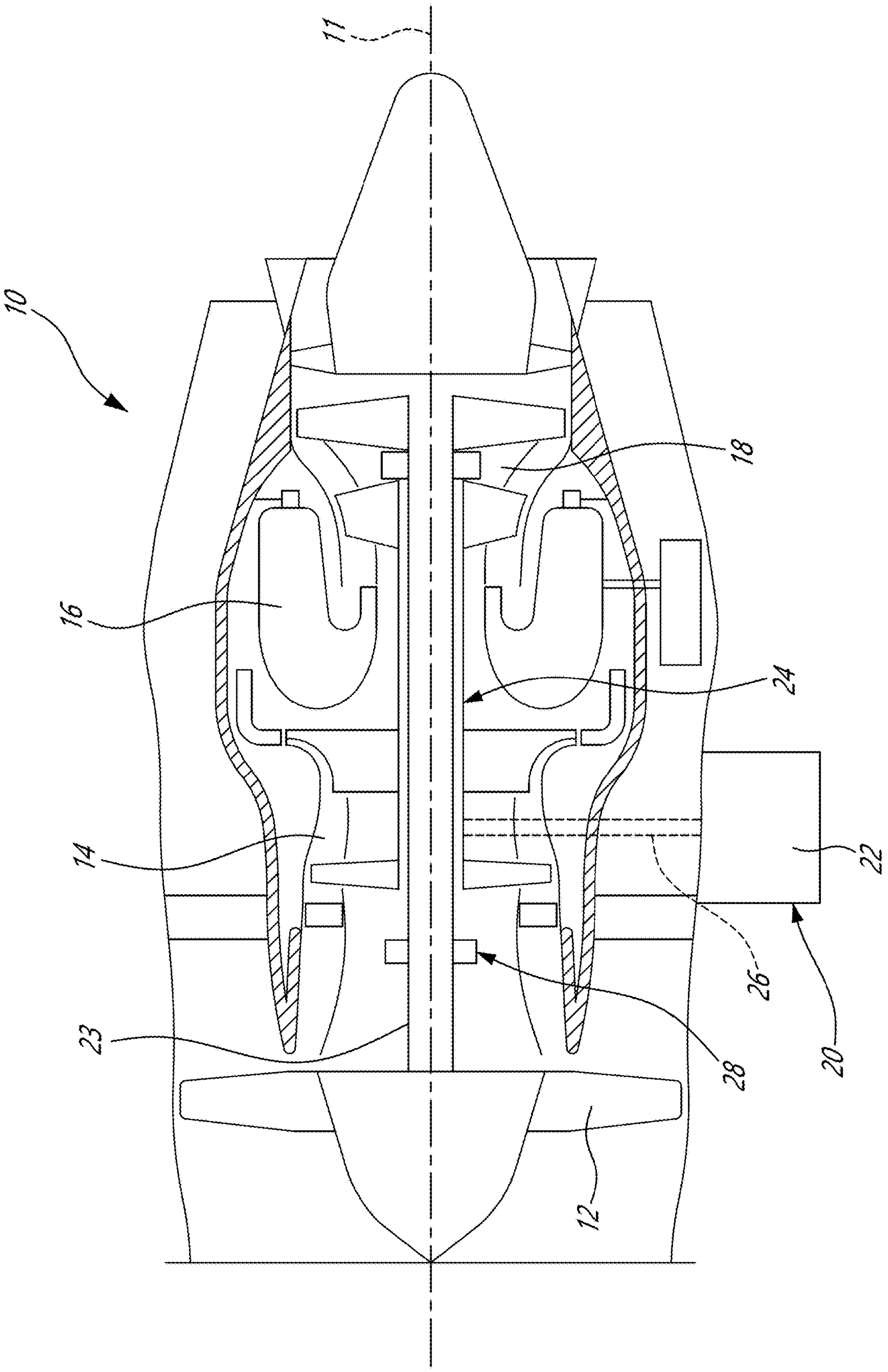
FIG. 1 is a schematic cross-sectional view of an aircraft engine depicted as a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

The fan 12 is drivingly interconnected to low pressure rotor(s) of the turbine section 18 through a low pressure shaft 23, and the high pressure rotor(s) of the compressor section 14 is/are drivingly connected to high pressure rotor (s) of the turbine section 18 through a high pressure shaft 24 concentrically surrounding the low pressure shaft 23.

The gas turbine engine 10 may include an accessory drive assembly 20 which includes an accessory gearbox (AGB) 22. Although not shown, the accessory drive assembly 20 can also include a pump assembly and/or a starter generator. The accessory drive assembly 20 may be driven by the high pressure shaft 24 via an accessory shaft 26 which drivingly interconnects the high pressure shaft 24 and the accessory gearbox 22. Bearings 28 may be used to rotatably support different components of the engine 10, such as the high- or low-pressure shafts 24, 23 and components of the AGB 22. Those bearings 28 may be located within bearing cavities, which may be connected to a source of lubricant for cooling and lubricating the bearings. In some cases, the bearing cavities are connected to a source of compressed air, such as a stage of the compressor section 14, for maintaining a pressure outside the bearing cavities greater than that inside them to limit leakage of lubricant. In the description below, the terms “lubricant” and “oil” are used interchangeably.

Figure 2:
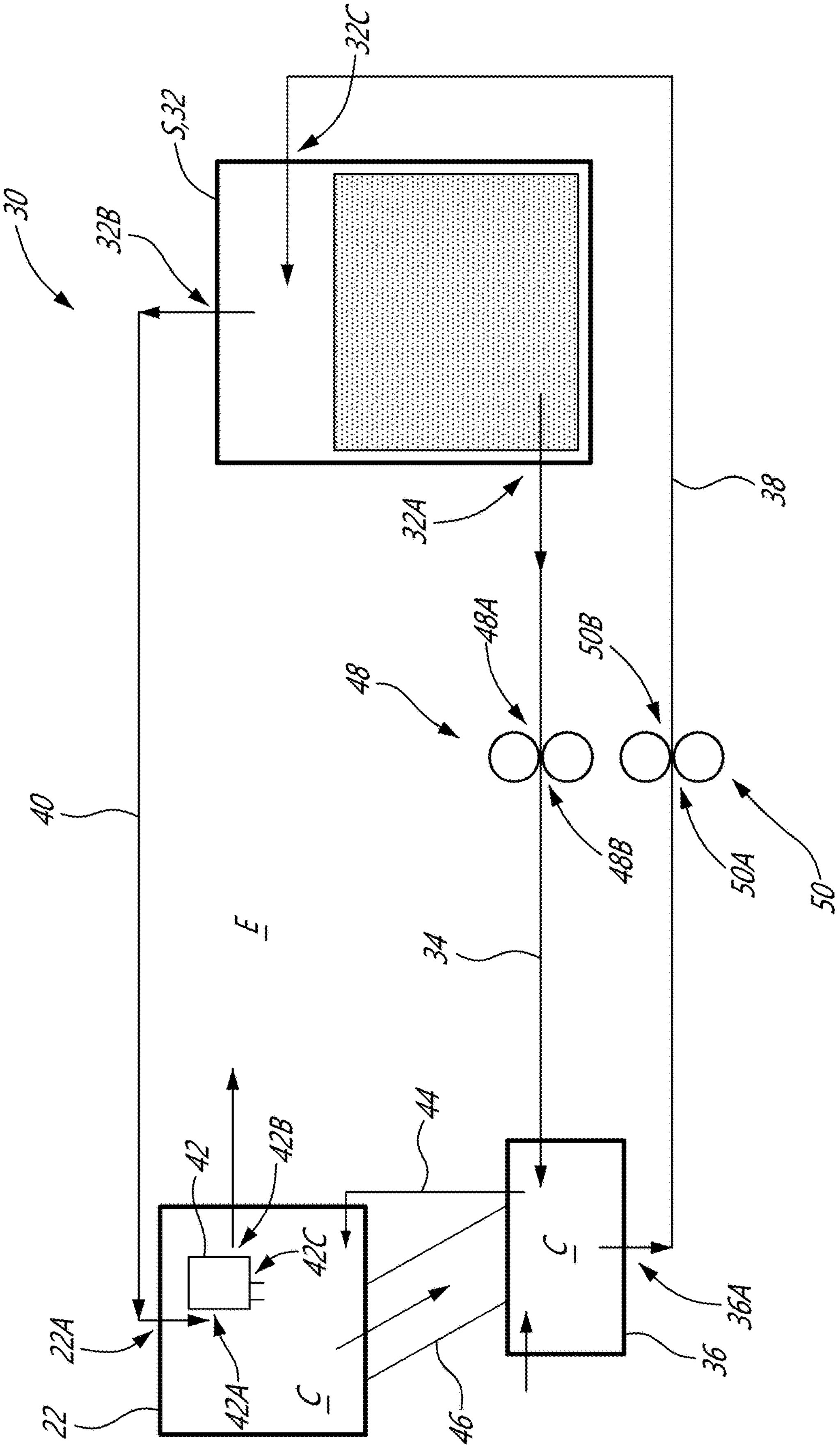
FIG. 2 is a schematic view of an oil supply system which can be used in the gas turbine engine such as shown in FIG. 1.

Referring now to FIG. 2, an oil supply system is shown generally at 30. The system 30 includes a source of oil S, which in this case is an oil tank 32. The system 30 further includes a main line 34 hydraulically connected to an outlet 32A of the oil tank 32 and to at least one lubricating cavity C, which may include the AGB 22 and one or more bearing cavities 36 containing some of the bearings 28 (FIG. 1). The system 30 may be used to provide oil to any component in need of oil such as, for instance, a gearbox, a bearing cavity, an actuator, and so on. The system 30 further includes a scavenge line 38 hydraulically connected to a scavenge outlet 36A of the bearing cavity(ies) 36 (or any other components) and to the oil tank 32 for returning scavenged oil back to the oil tank where a de-aeration process may naturally undergo.

A vent line 40 hydraulically connects an air outlet 32B of the oil tank 32 to an air inlet 22A of the AGB 22. The vent line 40 may be in fluid communication with an environment E outside the oil tank 32. A de-oiler 42 may be located within the cavity C of the AGB 22. The de-oiler 42 may have an air-oil inlet 42A for receiving an air-oil mixture and an air outlet 42B for expelling air. The air-oil mixture received within the de-oiler 42 via its air-oil inlet 42A may be composed mainly of air. The oil contained within this mixture may in part come from the oil contained within the cavity C that is jetted therein and that splashes upon impact with rotating gear(s) of the AGB 22. The de-oiler 42 may have an oil outlet 42C for outputting oil extracted from the air-oil mixture. The de-oiler 42 may remove a remainder of oil contained within the air-oil mixture flowing within the vent line 40 and may expel the air to an environment E outside the system 30. The extracted oil may exit the de-oiler 42 via the oil outlet 42C and may be used for lubrication. The oil exits the de-oiler 42 via the oil outlet 42C and may lubricate components of the AGB 22 and/or the bearings 28 contained in the bearing cavities 36. The substantially de-oiled air may exit the de-oiler 42 via its air outlet 42B and be expelled to the environment E. The de-oiler 42 may include a porous medium (e.g., sponge) through which an air-oil mixture is injected for agglomerating oil droplets into bigger droplets.

In the embodiment shown, the oil is injected first into the bearing cavity 36 and directed to the AGB 22 via a line 44. Once the oil has lubricated the components of the AGB 22, the oil may circulate by gravity or other means toward the bearing cavity 36 via one or more conduits 46. Other configurations are contemplated without departing from the scope of the present disclosure. For instance, the oil may lubricate the bearings 28 (FIG. 1) in the bearing cavities 36 before being directed to the AGB 22 for lubrication thereof.

In the embodiment shown, a main pump 48 and a scavenge pump 50 are used to drive a flow of oil in the main line 34 and scavenge line 38, respectively. In other words, the main pump 48 is hydraulically connected on the main line 34 and the scavenge pump 50 is hydraulically connected on the scavenge line 38. The main pump 48 has a main pump inlet 48A hydraulically connected to the outlet 32A of the oil tank 32 and a main pump outlet 48B hydraulically connected to the lubricating cavities C. The scavenge pump 50 has a scavenge pump inlet 50A hydraulically connected to the scavenge outlet 36A of the cavities C and a scavenge pump outlet 50B hydraulically connected to the oil tank 32 via an inlet 32C thereof. Other configurations are contemplated without departing from the scope of the present disclosure. For instance, the oil may be scavenged with separate scavenge pumps and/or by blow down. Also, more than one scavenge pump and/or more than one main pump may be used in some embodiments.

Typically, in the above described oil system 30, the scavenged oil mixture sent back to the oil tank 32 separates from the air it contains in an almost stagnant environment. This separation may require a residence time of the scavenged oil in the tank. This may be undesired.

Figure 3:
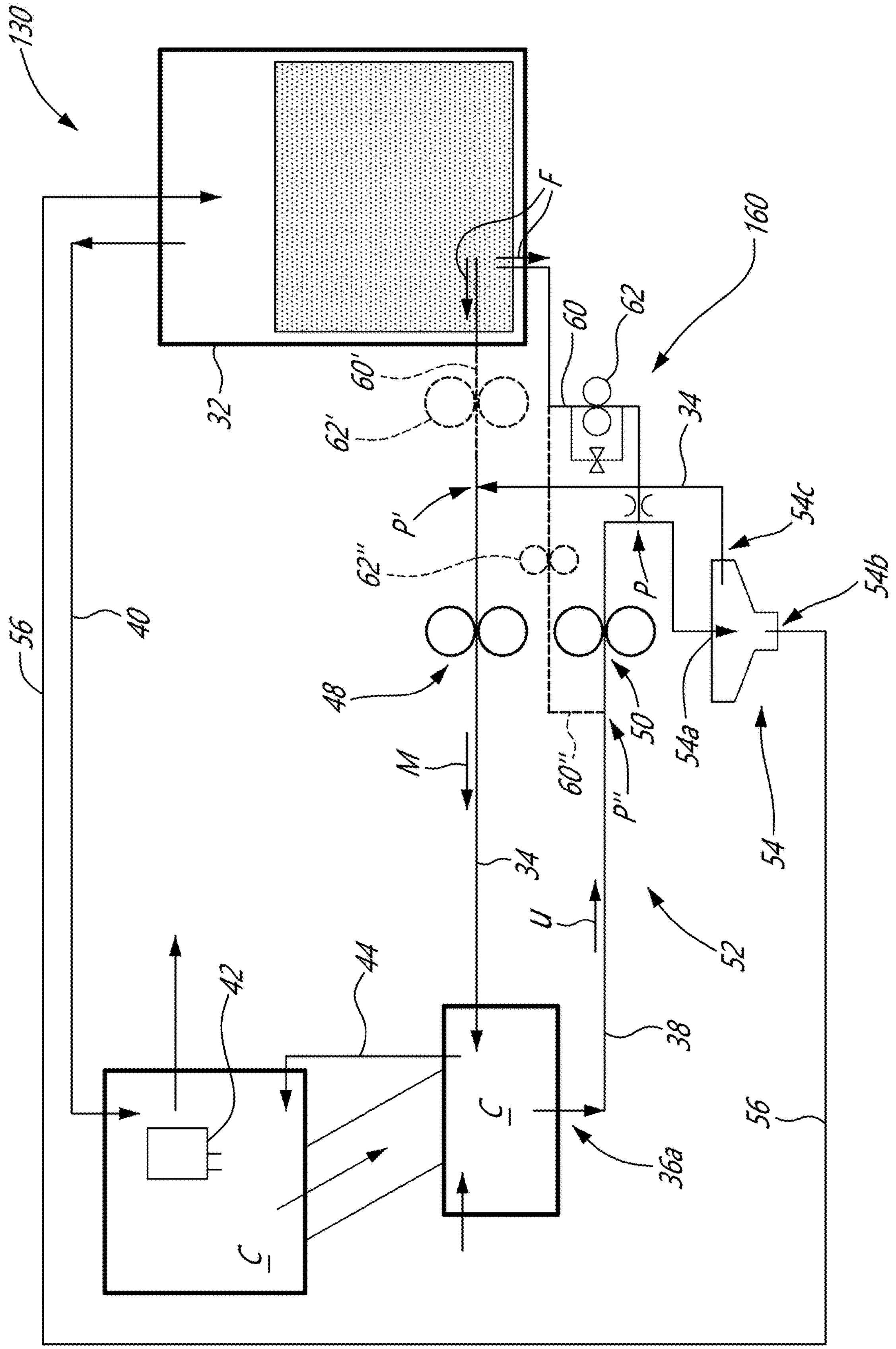
FIG. 3 is a schematic view of an oil supply system including a closed-loop oil circuit.

Referring now to FIG. 3, another embodiment of an oil system is shown generally at 130. The oil system 130 includes a closed-loop oil circuit 52 in which oil may circulate in loop to and from the cavities C. The system 130 includes a de-aerator 54 for separating the air from the scavenged oil. In other words, contrary to the oil system 30 described above with reference to FIG. 2, the scavenged oil is de-aerated via its passage into the de-aerator 54 and returned to the cavities C thereby bypassing the oil tank 32.

The de-aerator 54 has an air-oil inlet 54A, air-oil outlet 54B and an oil outlet 54C. The air-oil inlet 54A is hydraulically connected to the scavenge outlet 36A of the cavity C via the scavenge line 38; the air-oil outlet 54B is hydraulically connected to the oil tank 32 via a return line 56; and the oil outlet 54C is hydraulically connected to the cavities C via the main line 34. As shown in FIG. 3, the return line 56 is hydraulically connected to the de-oiler 42 via the vent line 40. The de-aerator 54 is used to remove the air from a first air-oil mixture it receives via the air-oil inlet 54A. In some cases, however, the de-aerator 54 is unable to extract an entirety of the oil from the received first air-oil mixture. In such a case, a second air-oil mixture is outputted from the de-aerator 54 via the air-oil outlet 54B and is directed toward the tank 32 where air and oil of the second air-oil mixture may separate. It will be appreciated that an oil concentration of the first air-oil mixture may be greater than that of the second air-oil mixture. The disclosed de-aerator has solely two outlets: the oil outlet 54C and the air-oil outlet 54B. The de-aerator 54 may have solely three connections to the oil system 130, that is the air-oil inlet 54A, the air-oil outlet 54B, and the oil outlet 54C, and may be free of other connections to the oil system.

The de-aerator may be an “active” de-aerator, such as a centrifugal deaerator which has at least one component (such as a rotor, for example), which is driven, such as by electrical and/or pneumatic and/or hydraulic or other means (motors, actuators, etc.). An example of such an active de-aerator is described in U.S. Pat. No. 8,601,785, the entire content of which is incorporated herein by reference. Herein, an active de-aerator may be an assembly including a rotor, and defining an inlet, an oil outlet, and an air outlet; the inlet, the oil outlet, and the air outlet being static relative to the rotor. An active de-aerator may rely on centrifugal force for separating the oil from the air. The de-aerator 54 may differ from the de-oiler 42 as it may not include a porous medium. A cross-section of the rotor may ensure that a positive pressure differential is maintained between the air outlet and the oil outlet; the oil outlet being at a higher pressure tan the air outlet. In some cases, “passive” de-aerator, that is, a de-aerator that do not include a moving part (e.g., the rotor), may be used. Such a passive de-aerator may use a swirl pot. For instance, such a passive de-aerator may include a spiral tube in which the flow is forced into by the scavenge pump(s). The spiral tube may separate the oil and the air using a centrifugal effect.

The de-oiler 42 is designed to remove a small quantity of oil (e.g., oil droplets/mist) remaining in an air flow injected therein via the vent line 40. This is different than the de-aerator 54 that is designed to remove a small quantity of air from an oil mixture. In other words, the de-oiler 42 may remove a small quantity of oil remaining within a mixture composed mainly of air before expelling said air to the environment E. The de-aerator 54 may remove a small quantity of air remaining within a mixture composed mainly of oil before distributing said oil to the lubricating cavities.

In some cases, the oil circulating within the closed-loop oil circuit 52 may be consumed (e.g., burned, leaked, and so on). In other transient cases, such as gusts or manoeuvres, oil may temporarily accumulate in the cavities, therefore reducing the scavenged flow sent to the de-aerator. In such cases, oil may need to be added to the closed-loop oil circuit 52. In the embodiment show, the system 130 further includes a make-up flow conduit 60; a plurality of available positions of the make-up flow conduit 60 are shown in dashed lines in FIG. 3 and are referred to herein below as 60, 60', 60". Those positions are described herein below. In each cases, the make-up flow conduit 60, 60', 60" may have an inlet hydraulically connected to the oil tank 32 for receiving a make-up flow of oil denoted by arrow F.

In a first possibility, the make-up flow conduit 60 is hydraulically connected to the scavenge line 38 at a connection point P located between the scavenge pump 50 and the de-aerator 54. Stated differently, the make-up flow conduit 60 may be connected upstream of the de-aerator 54 and downstream of the scavenge pump 50 relative to a scavenge flow of oil denoted by arrow U. Other locations on the scavenge line 38 are contemplated. In a second possibility, the make-up flow conduit 60' is hydraulically connected to the main line 34 at a connection point P' located between the de-aerator 54 and the main pump 48. Stated differently, the make-up flow conduit 60' may be connected downstream of the de-aerator 54 and upstream of the main pump 48 relative to a main flow of oil circulating within the main line 34 and denoted by arrow M. Other locations on the main line 34 are contemplated. In a third possibility, the make-up flow conduit 60" is hydraulically connected to the scavenge line 38 at a connection point P" located between the scavenge outlet 36A of the cavity 36 and the scavenge pump 50. Stated differently, the make-up flow conduit 60" may be connected upstream of the scavenge pump 50 and downstream of the scavenge outlet 36A relative to the scavenge flow U. It is understood that other possibilities are contemplated without departing from the scope of the present disclosure. For each of the above described possible connections of the make-up flow conduit 60, 60', 60", a make-up pump 62, 62', 62" may be hydraulically connected on the make-up flow conduit 60, 60', 60" to induce a flow from the oil tank 32 towards the connection points P, P', P" described above.

It has been observed by the inventors of the present disclosure that a requirement for the make-up flow F may vary from engine to engine and may vary depending on operating conditions of the gas turbine engine 10. It may thus be desired to adjust the make-up flow F outputted by the make-up flow pump 62, 62', 62". One way to meter the make-up flow F is to use a metering orifice fluidly connected in parallel to the make-up flow pump 62, 62', 62". However, metering the make-up flow with such a metering orifice may require the make-up pump 62, 62', 62" to discharge an oil conduit rather than in an air-oil mixture conduit to be effective. Otherwise, discharging an air-oil mixture may: prevent the metering of the make-up flow F since the pressure at an inlet of the metering valve may be below a given threshold such that the metering valve could barely bypass any flow; and cause the pump to unprime given that it could recirculate gas instead of a liquid around the make-up pump 62, 62', 62".

Figure 4:
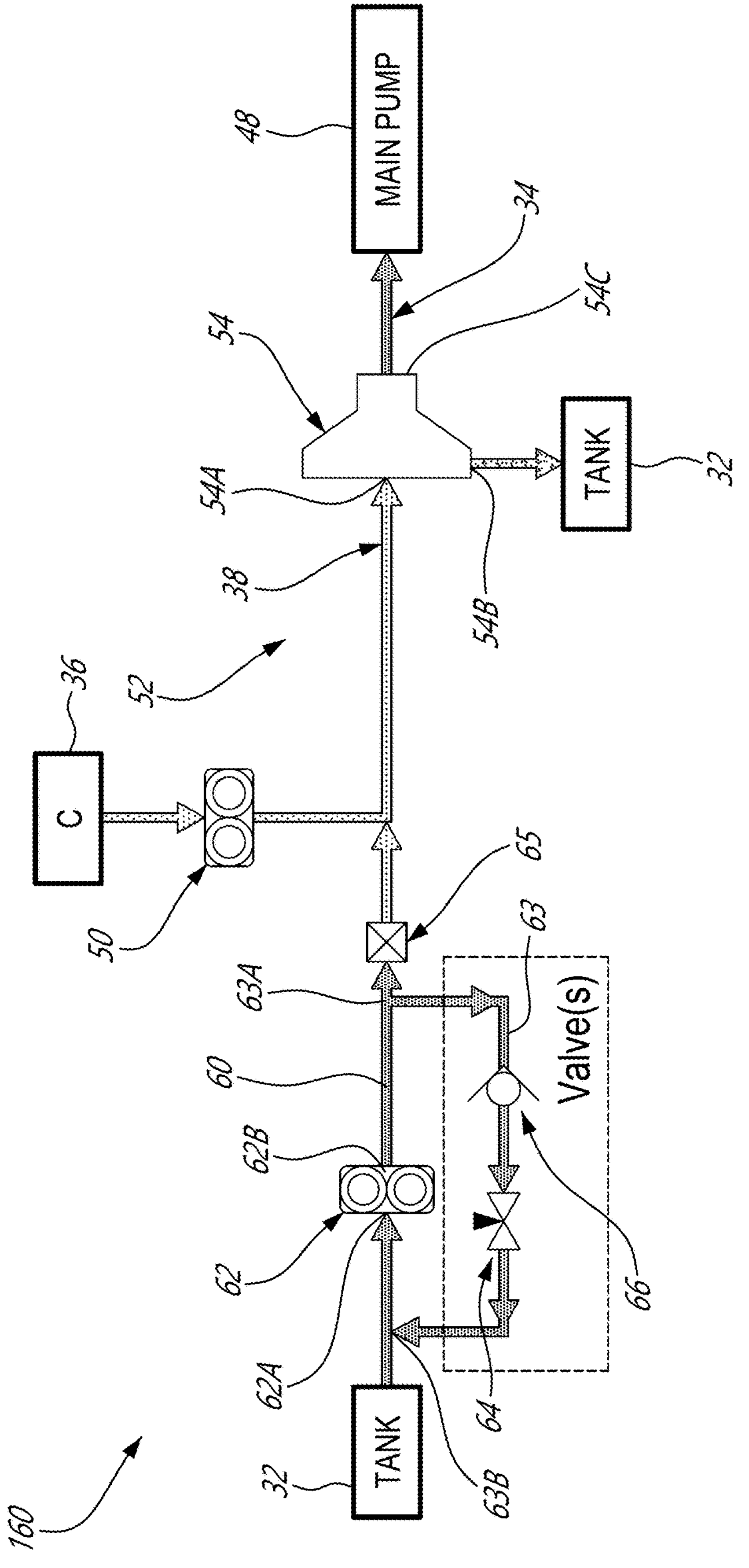
FIG. 4 is a schematic view of a portion of the oil supply system of FIG. 3 illustrating a system for adding oil in the closed-loop oil circuit in accordance with one embodiment.

Referring now to FIG. 4, the aforementioned drawbacks may at least partially be alleviated by features described below. FIG. 4 illustrates an enlarged portion of FIG. 3. FIG. 4 illustrates a system for adding oil in the closed-loop oil circuit 52. The system is shown at 160.

In the embodiment shown, the oil supply system 30 includes the make-up flow conduit 60 fluidly connecting the oil tank 32 to the closed-loop oil circuit 52, and the make-up pump 62 having a make-up pump inlet 62A fluidly connected to the oil tank 32 and a make-up pump outlet 62B fluidly connected to the closed-loop oil circuit 52. In the embodiment shown, the make-up flow conduit 60 merges into the closed-loop oil circuit 52 downstream of the scavenge pump 50 and upstream of the air-oil inlet 54A of the de-aerator 54. Other positions are contemplated as explained above with reference to FIG. 3.

A recirculation conduit 63 is configured to reduce a flow rate of oil reaching the closed-loop oil circuit 52 below a flow rate of oil generated by the make-up pump 62. The recirculation conduit 63 extends in parallel to the make-up pump 62 and fluidly connects the make-up pump outlet 62B to the make-up pump inlet 62A while bypassing the make-up pump 62. Put differently, the recirculation conduit 63 stems from the make-up flow conduit 60 at an inlet connection point 63A and merges back into the make-up flow conduit 60 at an outlet connection point 63B. The inlet connection point 63A is located downstream of the make-up pump 62 relative to a make-up flow outputted by the make-up pump 62. The outlet connection point 63B is located upstream of the make-up pump 62 relative to the make-up flow. The recirculation conduit 63 therefore defines a flow path allowing oil leaving the make-up pump 62 to be re-fed to the make-up pump 62 rather than being injected into the closed-loop oil circuit 52.

A metering orifice 64 is fluidly connected on the recirculation conduit 63 downstream of the inlet connection point 63A and upstream of the outlet connection point 63B relative to a flow of oil in the recirculation conduit 63. The metering orifice 64 has a flow circulating area selected to reduce a flow rate inputted into the closed-loop oil circuit 52 below a flow rate generated by the make-up pump 62. Put differently, the metering orifice 64 permits some of the oil to leave the make-up flow conduit 60 before reaching the closed-loop oil circuit 52. The greater the flow circulating area of the metering orifice 64, the greater will be the flow rate of oil through the recirculation conduit 63 and, thus, the lower will be the make-up flow rate injected in the closed-loop oil circuit 52.

The function of the metering orifice 64 is to meter the recirculating flow around the make-up pump 62. The metering orifice 64 may be defined by a valve and may have a variable flow circulating area, or maybe a fixed orifice having a single, non-variable, flow circulating area. Put differently, the metering orifice 64 may be defined by a valve having a plurality of configurations each associated to a respective area of the metering orifice. The valve may be an actuated valve (e.g., hydromechanical, electromechanical, etc) operatively connected to a controller operable to vary the flow circulating area and, thus, the flow rate of oil inputted in the closed-loop oil circuit 52 based on operating parameters of the oil system 30. The metering orifice 64 may also include a plurality of orifices. As it will be appreciated from the description above that explains the functioning of the metering orifice, the metering orifice 64 may also be referred to herein as a flow restrictor, given that its function, as described herein, is to restrict a flow rate of oil flowing therethrough. Any means able to at least Partially restrict a flow may be contemplated. These parameters may include a flow rate of oil in the closed-loop oil circuit 52, a percentage of air in an air-oil mixture flowing in the closed-loop oil circuit 52, an oil pressure in the closed-loop oil circuit 52, and so on.

Still referring to FIG. 4, it may be required to prevent a flow of an air-oil mixture flowing out of the scavenge pump 50 from reaching the recirculation conduit 63. This may happen in situations where the gas turbine engine 10 experiences a transient manoeuvre. More specifically, an air content of the air-oil mixture could cause the make-up flow pump to unprime if said mixture were to flow through it, or if the make-up pump tank outlet line 60 is exposed to air, or if the line 60 drains at shut down thus exposing the make-up pump 62 to air at start-up. To this end, a fixed orifice 65 is fluidly connected to the make-up flow conduit 60 upstream of the closed-loop oil circuit 52, more specifically upstream or at a connection point between the make-up flow conduit 60 and the closed-loop oil circuit 52, and downstream of the recirculation conduit 63, more specifically downstream of the inlet connection point 63A, relative to the make-up flow of oil flowing in the make-up flow conduit 60 towards the closed-loop oil circuit 52.

The fixed orifice 65 has a flow circulating area selected to increase a pressure at the make-up pump outlet 62B above a pressure at the air-oil inlet 54A of the de-aerator 54. The fixed orifice 65 may include a plurality of orifices. As noted above, the fixed orifice 65 may also be referred to herein as a flow restrictor, given that its function, as described herein, is to restrict a flow rate of oil flowing therethrough. Any means able to at least Partially restrict a flow may be contemplated. By increasing the pressure at the make-up pump outlet 62B above that at the air-oil inlet 54A of the de-aerator 54, the oil will follow the path of least resistance and flow towards the de-aerator 54 rather than back towards the make-up pump 62. Hence, the fixed orifice 65 may lower an air content of a fluid at the make-up pump outlet 62B. Such a change in composition may allow metering of this oil.

In the embodiment shown, a check valve 66 is fluidly connected on the recirculation conduit 63 between the inlet connection point 63A and the outlet connection point 63B. The check valve 66 is configured to prevent a flow of either oil or an air-oil mixture from the outlet connection point 63B towards the inlet connection point 63A. The check valve 66 is configured to open, thus permitting oil to flow from the inlet connection point 63A to the outlet connection point 63B, when a pressure in the recirculation conduit 63 reaches a pressure threshold. In other words, the check valve is configured to be closed below a pressure threshold thus preventing the de-aerator inlet mixture to reach the make-up inlet. This pressure threshold is less than a minimum pressure differential of operation of the make-up pump 62. Stated otherwise, the fixed orifice 65 is sized such that the make-up pump 62 operates at a minimum pressure differential-high pressure differential most often happening in cold conditions-yet above the pressure threshold of the check valve 66 in all steady state operating conditions.

Figure 5:
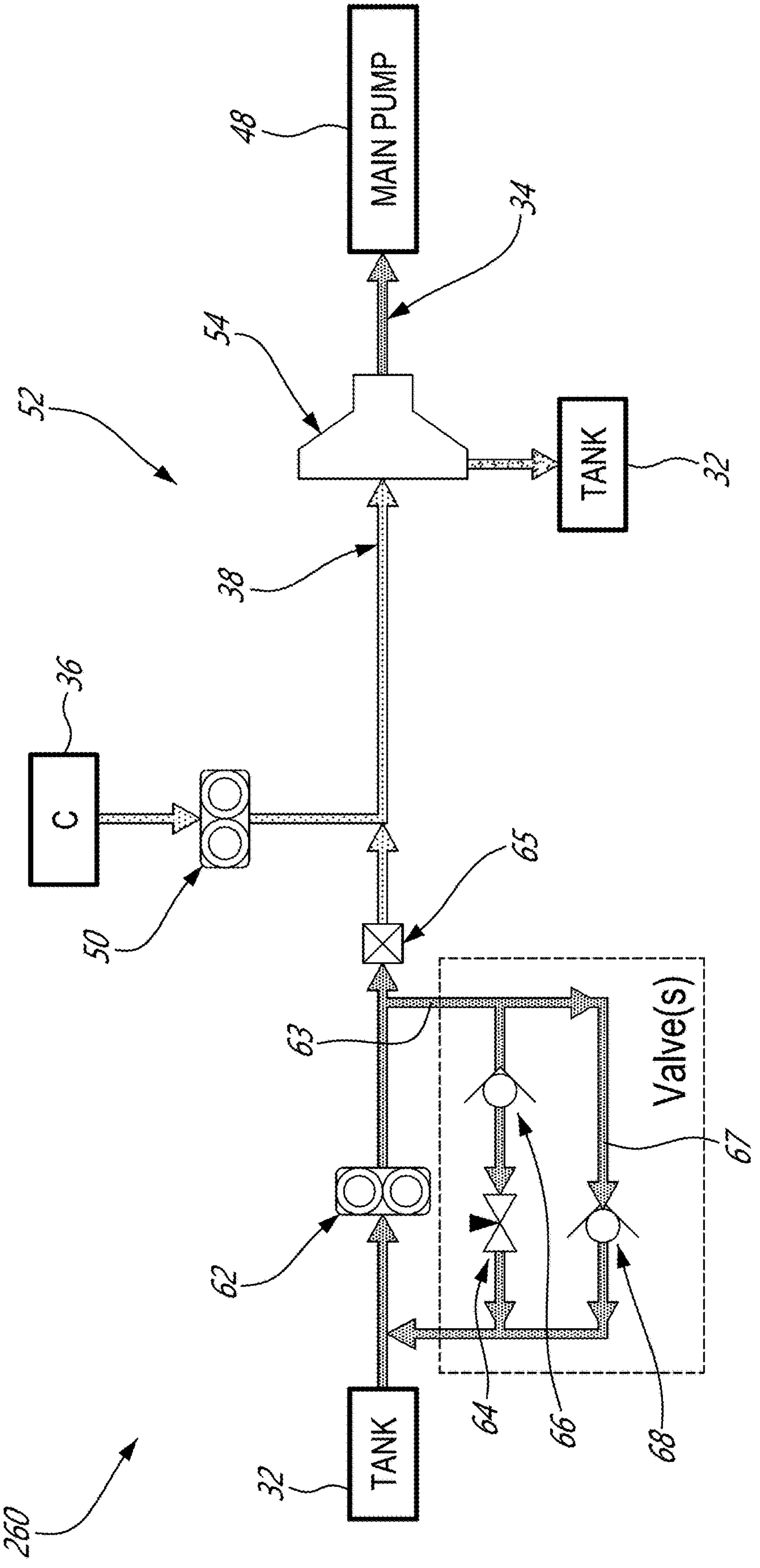
FIG. 5 is a schematic view illustrating a system for adding oil in the closed-loop oil circuit of FIG. 3 in accordance with another embodiment.

Referring now to FIG. 5, another embodiment of a system for injecting a make-up flow of oil in the closed-loop circuit is shown at 260. For the sake of conciseness, only features differing from the system 160 of FIG. 4 are described below.

In the embodiment shown, the system 260 includes a second recirculation conduit 67 extending in parallel to both of the make-up pump 62 and the recirculation conduit 63. The second recirculation conduit 67 fluidly connects the make-up pump outlet 62B to the make-up pump inlet 62A while bypassing both of the make-up pump 62 and the recirculation conduit 63.

A second check valve 68 is fluidly connected on the second recirculation conduit 67. The second check valve 68 is configured to prevent oil from flowing from the oil tank 32 to the closed-loop oil circuit 52 via the second recirculation conduit 67 as for the check valve 66. However, the second check valve 68 is configured to permit a flow of the oil through the second recirculation conduit 67 when a pressure at the fixed orifice 65 is above a pressure threshold which is higher than a pressure threshold required to cause the opening of the check valve 66. This second check valve 68 may be considered a safety feature and may prevent the pressurization of the make-up pump 62 if the flow circulating area of the metered orifice 64 cannot be sized to avoid over pressurization of the make-up pump 62. The second check valve 68 is configured to permit a flow of the oil through the second recirculation conduit when a pressure at the fixed orifice is above a pressure threshold. The second check valve 68 is configured for preventing oil from flowing from the oil tank to the closed-loop oil circuit via the second recirculation conduit.

Figure 6:
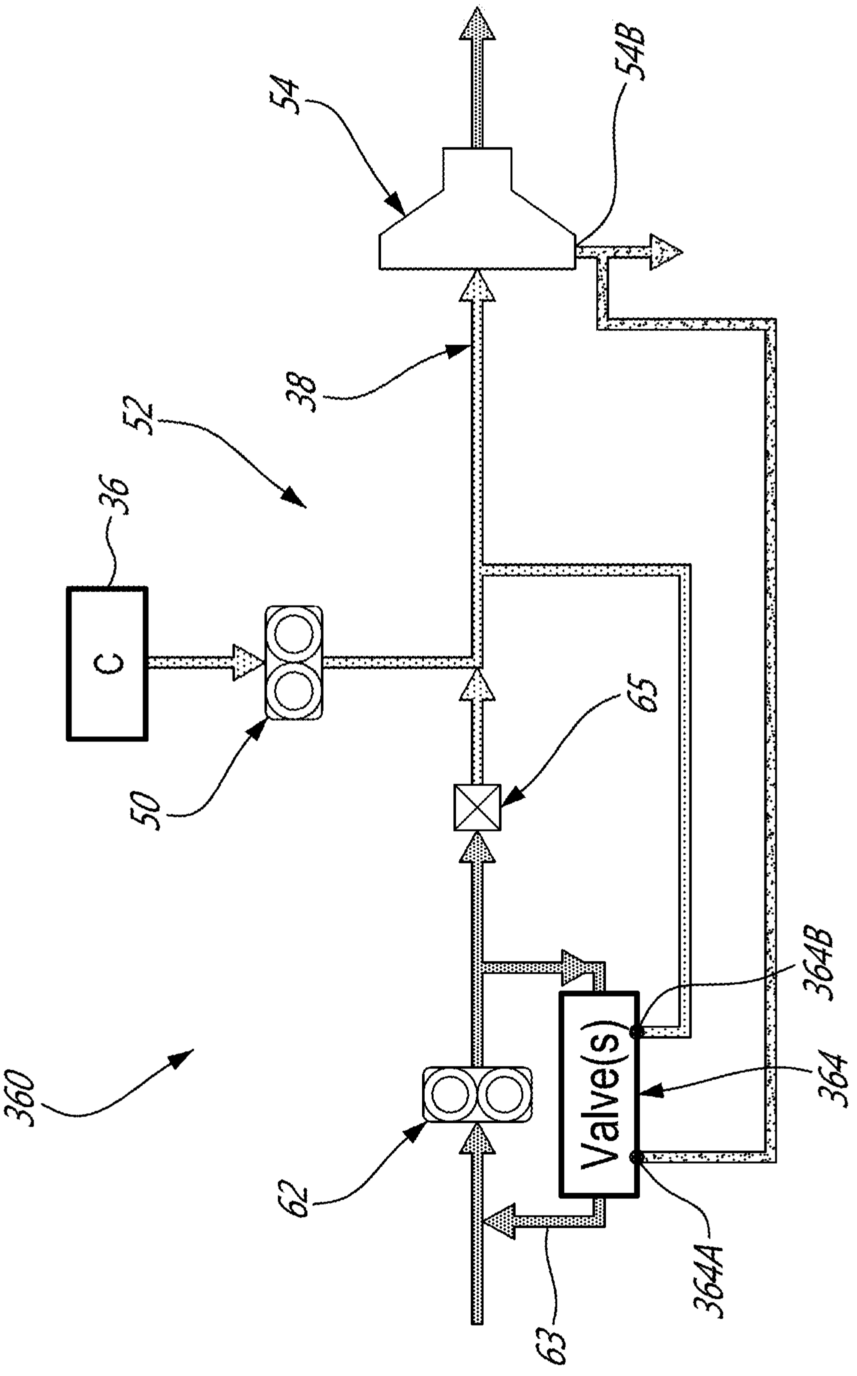
FIG. 6 is a schematic view illustrating a system for adding oil in the closed-loop oil circuit of FIG. 3 in accordance with another embodiment.

Referring now to FIG. 6, another embodiment of a system for injecting a make-up flow of oil in the closed-loop circuit is shown at 360. For the sake of conciseness, only features differing from the system 160 of FIG. 4 are described below.

In the embodiment shown, the metered orifice may be a pressure-referenced valve 364 having a first reference port 364A fluidly connected to the air-oil outlet 54B of the de-aerator 54 and a second reference port 364B fluidly connected to the closed-loop oil circuit 52 between the component 36 and the de-aerator 54. The pressure-referenced valve 364 is configured to vary the area of a metering orifice as a function of a pressure difference between a first pressure at the first reference port 364A and a second pressure at the second reference port 364B. A combination of both internally and externally referenced valves may be used. The pressure-referenced valve 364 may thus be configured to reduce its flow circulating area when the pressure difference is indicative that more oil is required in the closed-loop oil circuit 52.

Figure 7:
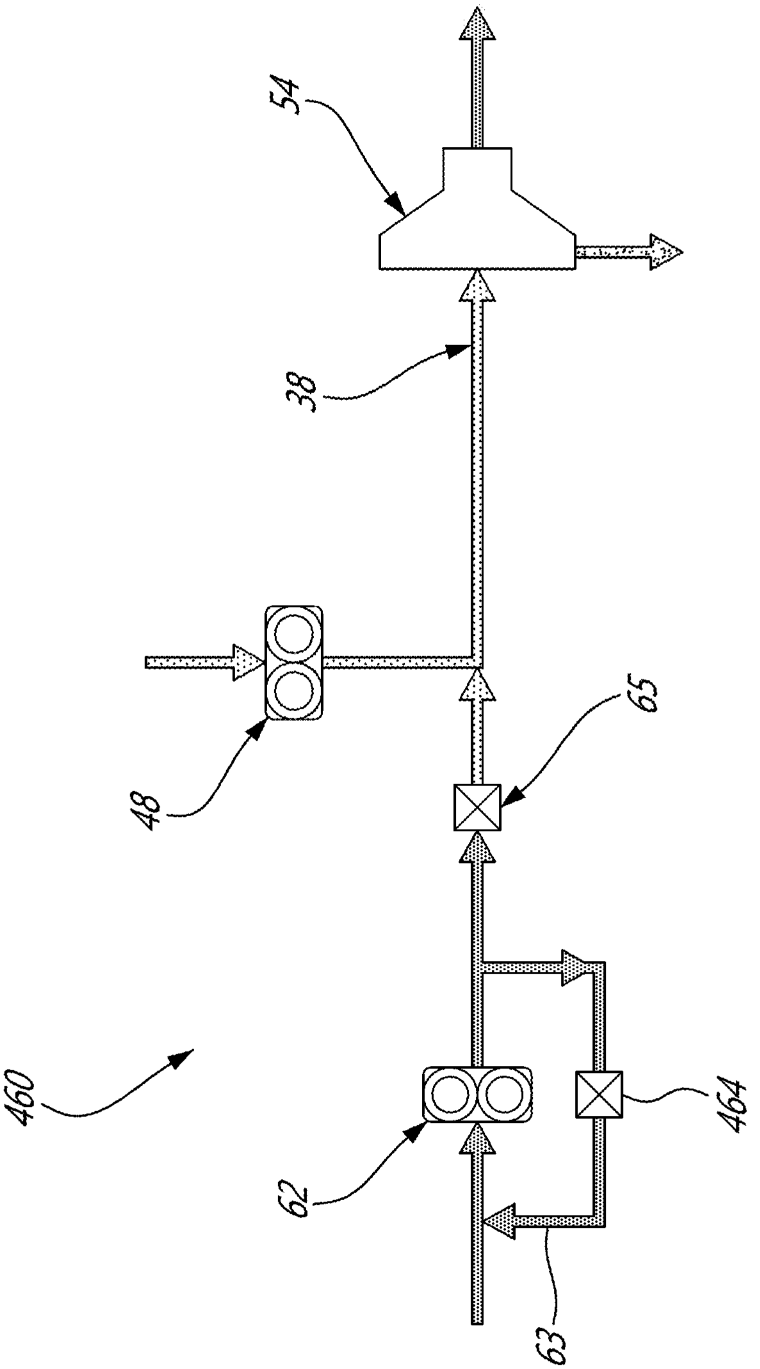
FIG. 7 is a schematic view illustrating a system for adding oil in the closed-loop oil circuit of FIG. 3 in accordance with another embodiment.

Referring now to FIG. 7, another embodiment of a system for injecting a make-up flow of oil in the closed-loop circuit is shown at 460. For the sake of conciseness, only features differing from the system 160 of FIG. 4 are described below.

In this embodiment, the metered orifice is a second fixed orifice 464. Put differently, the flow metering function could be achieved by having 2 replaceable fixed size control orifices, which may be replaced after engine run. The metering function may be achieved by selecting each orifice diameter to meter the flow going through each branch. Hence, the flow circulating areas of the fixed orifice 65 and of the second fixed orifice 464 may be different and selected to ensure the metering capability in the recirculation conduit 63 while ensure that the oil out of the scavenge pump 50 does not flow towards the make-up pump 62.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An oil supply system of an aircraft engine, comprising:

an oil tank;

a closed-loop oil circuit including a component having an inlet and a scavenge outlet, a pump having a main pump inlet and a pump outlet, the pump outlet hydraulically connected to the inlet of the component, and a de-aerator having a de-aerator inlet hydraulically connected to the scavenge outlet, a de-aerator air-oil outlet in fluid flow communication with the oil tank, and a de-aerator oil outlet hydraulically connected to the main pump inlet;

a make-up flow conduit fluidly connecting the oil tank to the closed-loop oil circuit;

a make-up pump having a make-up pump inlet fluidly connected to the oil tank and a make-up pump outlet fluidly connected to the closed-loop oil circuit;

a recirculation conduit in parallel to the make-up pump, the recirculation conduit fluidly connecting the make-up pump outlet to the make-up pump inlet while bypassing the make-up pump;

a fixed orifice fluidly connected to the make-up flow conduit upstream of the closed-loop oil circuit and downstream of the recirculation conduit, the fixed orifice having an area selected to increase a pressure at an outlet of the make-up pump above a pressure at the de-aerator inlet; and a metering orifice fluidly connected on the recirculation conduit, the metering orifice having a flow circulating area selected to reduce a flow rate inputted into the closed-loop oil circuit below a flow rate generated by the make-up pump.

2. The oil supply system of claim 1, wherein the metering orifice is defined by a valve having a plurality of configurations each associated to a respective area of the metering orifice.

3. The oil supply system of claim 2, wherein the valve is a pressure-referenced valve having a first reference port fluidly connected to the de-aerator air-oil outlet and a second reference port fluidly connected to the closed-loop oil circuit between the component and the de-aerator, the pressure-referenced valve configured to vary the area of the metering orifice as a function of a pressure difference between a first pressure at the first reference port and a second pressure at the second reference port.

4. The oil supply system of claim 1, wherein an area of the metering orifice is fixed.

5. The oil supply system of claim 1, comprising a check valve fluidly connected on the recirculation conduit, the check valve preventing oil from flowing from the oil tank to the closed-loop oil circuit via the recirculation conduit.

6. The oil supply system of claim 1, comprising a second recirculation conduit extending in parallel to both of the make-up pump and the recirculation conduit, the second recirculation conduit fluidly connecting the make-up pump outlet to the make-up pump inlet while bypassing both of the make-up pump and the recirculation conduit.

7. The oil supply system of claim 6, comprising a check valve fluidly connected on the second recirculation conduit, the check valve preventing oil from flowing from the oil tank to the closed-loop oil circuit via the second recirculation conduit, the check valve configured to permit a flow of the oil through the second recirculation conduit when a pressure at the fixed orifice is above a pressure threshold.

8. The oil supply system of claim 1, wherein a scavenge pump is hydraulically connected to the closed-loop oil circuit downstream of the component and upstream of the de-aerator inlet.

9. The oil supply system of claim 8, wherein the make-up flow conduit is fluidly connected to the closed-loop oil circuit downstream of the scavenge pump and upstream of the de-aerator relative to an oil flow in the closed-loop oil circuit.

10. The oil supply system of claim 1, wherein the component is one or more of an accessory gearbox and a bearing cavity.

11. An aircraft engine, comprising an oil supply system having:

a component receiving oil from a pump and outputting an air-oil mixture to a de-aerator;

a make-up flow conduit for inputting a make-up flow of the oil from an oil source to the component;

a make-up pump having a make-up pump inlet fluidly connected to the oil source and a make-up pump outlet in fluid flow communication with the component;

a recirculation conduit extending in parallel to the make-up pump, the recirculation conduit fluidly connecting the make-up pump outlet to the make-up pump inlet while bypassing the make-up pump;

a fixed orifice for increasing a pressure at an outlet of the make-up pump above a pressure at an inlet of the de-aerator; and a metering orifice fluidly connected on the recirculation conduit and configured to reduce a flow rate inputted into the component below a flow rate generated by the make-up pump.

12. The aircraft engine of claim 11, wherein the metering orifice is defined by a valve having a plurality of configurations each associated to a respective area of the metering orifice.

13. The aircraft engine of claim 12, wherein the valve is a pressure-referenced valve having a first reference port fluidly connected to an air-oil outlet of the de-aerator and a second reference port fluidly connected between the component and the de-aerator, the pressure-referenced valve configured to vary the area of the metering orifice as a function of a pressure difference between a first pressure at the first reference port and a second pressure at the second reference port.

14. The aircraft engine of claim 11, wherein an area of the metering orifice is fixed.

15. The aircraft engine of claim 11, comprising a check valve fluidly connected on the recirculation conduit, the check valve preventing oil from flowing from the oil source towards the component via the recirculation conduit.

16. The aircraft engine of claim 11, comprising a second recirculation conduit extending in parallel to both of the make-up flow pump and the recirculation conduit, the second recirculation conduit fluidly connecting the make-up pump outlet to the make-up pump inlet while bypassing both of the make-up pump and the recirculation conduit.

17. The aircraft engine of claim 16, comprising a check valve fluidly connected on the second recirculation conduit, the check valve preventing oil from flowing from the oil source towards the component via the second recirculation conduit, the check valve configured to permit a flow of the oil through the second recirculation conduit when a pressure at the fixed orifice is above a pressure threshold.

18. The aircraft engine of claim 11, wherein a scavenge pump is hydraulically connected to a scavenge outlet of the component and upstream of the de-aerator.

19. The aircraft engine of claim 18, wherein the make-up flow conduit is fluidly connected to an oil conduit fluidly connecting the scavenge pump to the de-aerator.

20. The aircraft engine of claim 11, wherein the component is one or more of an accessory gearbox and a bearing cavity.

* * * * *